(12) United States Patent
Rios

(10) Patent No.: US 10,748,142 B2
(45) Date of Patent: Aug. 18, 2020

(54) MULTI-CURRENCY TRANSACTION ROUTING PLATFORM FOR PAYMENT PROCESSING SYSTEM

(71) Applicant: MasterCard International Incorporated, Purchase, NY (US)

(72) Inventor: Wesley Frederico Espinal Rios, Sao Paulo (BR)

(73) Assignee: Mastercard International Incorporated, Purchase, NY (US)

( * ) Notice: Subject to any disclaimer, the term of this patent is extended or adjusted under 35 U.S.C. 154(b) by 1014 days.

(21) Appl. No.: 14/873,440

(22) Filed: Oct. 2, 2015

(65) Prior Publication Data
US 2017/0098213 A1 Apr. 6, 2017

(51) Int. Cl.
*G06Q 40/00* (2012.01)
*G06Q 20/38* (2012.01)
(Continued)

(52) U.S. Cl.
CPC ......... *G06Q 20/381* (2013.01); *G06Q 20/108* (2013.01); *G06Q 20/20* (2013.01);
(Continued)

(58) Field of Classification Search
CPC .................................................. G06Q 20/381
(Continued)

(56) References Cited

U.S. PATENT DOCUMENTS

| 8,892,462 | B1 | 11/2014 | Borovsky et al. |
| 2003/0163383 | A1* | 8/2003 | Engelhart .............. G06Q 20/02 705/75 |

(Continued)

FOREIGN PATENT DOCUMENTS

| WO | 03/010701 A1 | 2/2003 |
| WO | 2015/009427 A1 | 1/2015 |

OTHER PUBLICATIONS

"PCT Notification of Transmittal of the International Search Report and the Written Opinion" International Searching Authority, dated Dec. 9, 2016 (Sep. 12, 2016), for International Application No. PCT/US2016/053281, 12pgs.

*Primary Examiner* — Samica L Norman
(74) *Attorney, Agent, or Firm* — Buckley, Maschoff & Talwalker LLC

(57) ABSTRACT

According to some embodiments, a multi-currency transaction routing apparatus may include a first input to receive, from an acquirer bank, an electronic message containing information about a business as usual transaction including a generic primary account number. The multi-currency transaction routing apparatus may also include a storage device storing: (i) an association between the generic primary account number and a first primary account number of a first funding bank account in a first currency, and (ii) an association between the generic primary account number and a second primary account number of a second funding bank account in a second currency. A routing module computer may detect the generic primary account number within the electronic message and automatically transmit data about the transaction to a remote device associated with one of the first and second funding bank accounts in accordance with the associations stored in the storage device.

25 Claims, 11 Drawing Sheets

(51) Int. Cl.
*G06Q 20/34* (2012.01)
*G06Q 20/22* (2012.01)
*G06Q 20/32* (2012.01)
*G06Q 20/40* (2012.01)
*G06Q 20/20* (2012.01)
*G06Q 20/10* (2012.01)

(52) U.S. Cl.
CPC ....... *G06Q 20/227* (2013.01); *G06Q 20/3223* (2013.01); *G06Q 20/3224* (2013.01); *G06Q 20/34* (2013.01); *G06Q 20/405* (2013.01)

(58) Field of Classification Search
USPC ........................ 705/35, 37, 39, 42, 75, 26.41
See application file for complete search history.

(56) References Cited

U.S. PATENT DOCUMENTS

| | | | | |
|---|---|---|---|---|
| 2008/0249908 A1* | 10/2008 | Lorberg | ................ | G06Q 20/10 705/35 |
| 2010/0088219 A1* | 4/2010 | Knowles | .............. | G06Q 20/105 705/37 |
| 2011/0055083 A1* | 3/2011 | Grinhute | ................ | G06Q 20/10 705/42 |
| 2011/0282780 A1* | 11/2011 | French | ................... | G06Q 20/10 705/39 |
| 2011/0320345 A1 | 12/2011 | Taveau et al. | | |
| 2012/0330788 A1* | 12/2012 | Hanson | ................. | G06Q 30/06 705/26.41 |
| 2013/0166402 A1 | 6/2013 | Parento et al. | | |
| 2015/0032619 A1 | 1/2015 | Castinado et al. | | |

\* cited by examiner

900 →

| GENERIC PRIMARY ACCOUNT NUMBER 902 | CURRENCIES 904 | NEXT TRANSACTION SELECTION 906 |
|---|---|---|
| 1111-2222-3333-4444 | USD (PAN A)<br>EURO (PAN B) | EURO (PAN B) |
| 1234-5678-12343-5678 | EURO (PAN 1)<br>GBP (PAN 2) | GBP (PAN 1) |
| 5555-5555-5555-5555 | GBP (PAN X)<br>EURO (PAN Y)<br>USD (PAN Z) | USD (PAN Z) |

FIG. 9

| BUSINESS AS USUAL TRANSACTION IDENTIFIER 1002 | GENERIC PRIMARY ACCOUNT NUMBER 1004 | SELECTED FUNDING BANK ACCOUNT 1006 |
|---|---|---|
| T_1001 | 1234-5678-12343-5678 | GBP (PAN 1) |
| T_1002 | 5555-5555-5555-5555 | USD (PAN Z) |
| T_1003 | 1111-2222-3333-4444 | EURO (PAN B) |

FIG. 10

MULTI-CURRENCY TRANSACTION ROUTING PLATFORM FOR PAYMENT PROCESSING SYSTEM

FIELD OF THE INVENTION

Embodiments disclosed herein relate to methods, apparatus and systems that include a multi-currency routing platform that facilitates processing of payment card transactions.

BACKGROUND

Payment card systems are in widespread use. A prominent payment card system is operated by the assignee hereof, MasterCard International Incorporated, and by its member financial institutions. To initiate the transaction, a customer may visit a retail store operated by a merchant, selects goods that he/she wishes to purchase, and presents his/her payment card to a merchant's Point Of Sale ("POS") terminal. The POS terminal reads the customer's payment card account number from the payment card, and then sends an authorization request to an acquirer platform associated with a financial institution with which the merchant has a relationship. The authorization request typically includes the payment card account number, the amount of the transaction and other information, such as merchant identification and location. The authorization request message may be routed via a payment system authorization platform (which may be, for example, the well-known Banknet™ system operated by MasterCard International Incorporated) to an issuer platform of an issuer financial institution that issued the customer's payment card.

Assuming that all is in order, the issuer platform transmits a favorable authorization response to the acquirer platform through the payment system authorization platform. The transaction at the POS is then completed and the customer leaves the store with the goods. A subsequent clearing transaction initiated by the merchant results in a transfer of the transaction amount from the customer's payment card account to an account that belongs to the merchant. The customer's payment card account may be, for example, either a debit card account or a credit card account. In the former case, the clearing transaction results in the funds being debited directly from the account. In the latter case, the clearing transaction results in a charge being posted against the account, and the charge subsequently appears on the customer's monthly credit card statement.

The foregoing description of the typical transaction may be considered to be somewhat simplified in some respects. For example, a merchant processing system (not shown) may be interposed between the POS terminal and the acquirer platform. As is familiar to those who are skilled in the art, a merchant processing system may be operated by or on behalf of the merchant to form part of the communications path between the acquirer platform and a considerable number of POS terminals operated by the merchant. It is also often the case that a third party transaction processing service, such as a Payment Services Provider ("PSP"), may operate to handle payment card transactions on behalf of the acquirer and on behalf of a large number of other like financial institutions.

A cardholder who travels from country to country may face a foreign currency exchange rate dilemma when making a purchase. For example, he or she may have multiple payment cards, each associated at a different currency (e.g., U.S. dollars, European euros, British pounds, etc.). Moreover, each different currency will trade at a different exchange rate that will change on a day-to-day basis. It can be confusing and inconvenient for the cardholder to intelligently and efficiently choose between these various options.

The present inventors have recognized that there is a need for methods and/or systems to provide a multi-currency transaction routing platform to facilitate the processing of payment card transactions.

BRIEF DESCRIPTION OF THE DRAWINGS

FIG. 9 is a multi-currency router database that may be provided in accordance with some embodiments.

FIG. 10 is a transaction database that may be provided in accordance with some embodiments.

DETAILED DESCRIPTION

In general, and for the purpose of introducing concepts of embodiments of the present invention, a "payment card" may be used to process transactions. As used herein, the phrase "payment card" might refer to, for example, a credit card, a debit card, a loyalty program card, a badge, a license, a passport card, a radio frequency apparatus, a smartphone, and/or a contactless card.

Figure 1:
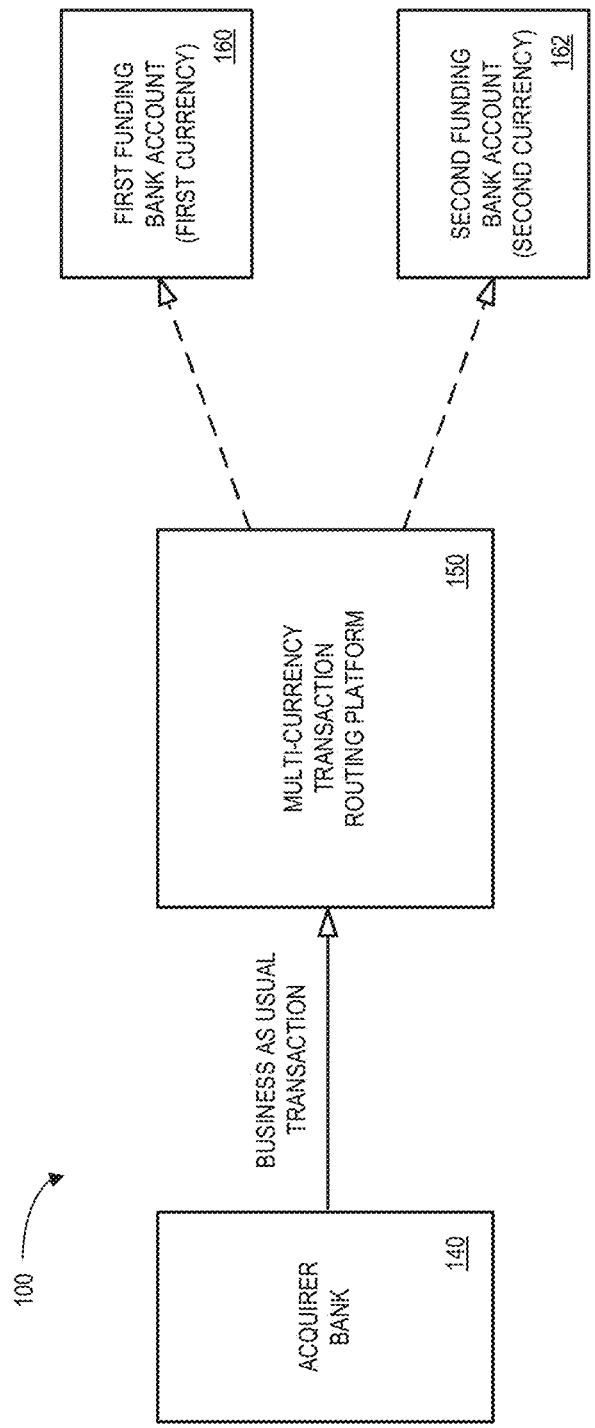
FIG. 1 illustrates a payment card system in accordance with some embodiments.

FIG. 1 is a block diagram of a transaction handling system 100 including components configured to operate in accordance with aspects of the processes described herein. It should be understood that the various components shown in FIG. 1 may be a subset of a larger system for handling payment card interactions with consumers and for facilitating purchase transactions between consumers and merchants via credit card accounts, debit card accounts, reward card accounts, other types of financial accounts and the like, and/or for facilitating payment transactions between one or more financial institutions such as acquirer and issuer banks.

An acquirement platform 140 may request authorization of a "business as usual" payment card transaction from an issuer bank via a credit card network. According to some embodiments described herein, a multi-currency transaction routing platform 150 (e.g., associated with the credit card network) may receive information about the business as usual transaction and arrange for the transaction to be routed to either a first funding bank account 160 (associated with a first currency) or a second funding bank account 162 (associated with a second currency different from the first currency). Note that any of the devices described herein may be located remote from each other and may communicate via communication networks (including, for example, proprietary communication networks). Although a single multi-currency transaction routing platform 150 is illustrated in FIG. 1 for simplicity, note that any number of such platforms may be provided instead.

Figure 2:
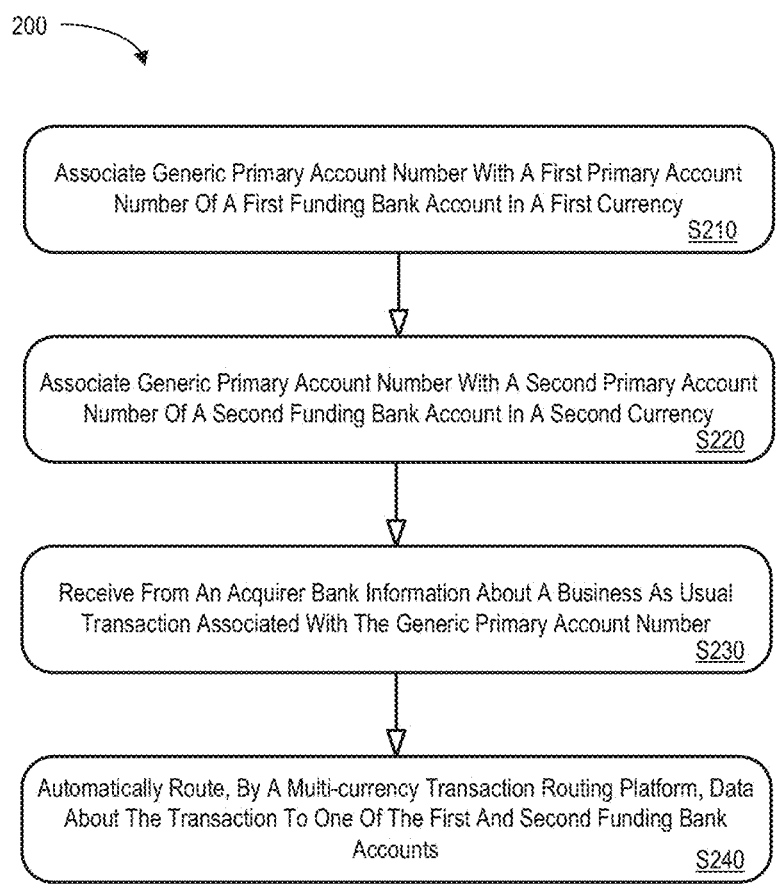
FIG. 2 is a payment system authorization method that may be performed according to some embodiments.

FIG. 2 illustrates a method 200 that might be performed by the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein. Further note that some or all of the steps may be "automated." As used herein, the term "automated" may refer to, for example, actions that can be performed with little or no human intervention.

At S210, a generic primary account number may be associated with a first primary account number of a first funding bank account in a first currency. As used herein, the phrase "primary account number" might be part of or otherwise associated with a payment card number, an "Issuer Identification Number ("IIN"), and/or "Bank Identification Number ("BIN"). Some or all of the numbers or identifiers may be, for example, allocated in accordance with the International Organization for Standardization ("ISO")/ International Electrotechnical Commission ("IEC") standard number 7812.

At S220, the generic primary account number may also be associated with a second primary account number of a second funding bank account in a second currency. The first and/or second funding bank accounts might comprise, for example, a credit card account, a debit card account, a pre-paid account, and/or an electronic transaction account. According to some embodiments, the first funding bank account and the second funding bank account are associated with a single issuer bank. According to other embodiments, the first funding bank account and the second funding bank account may be associated with different issuer banks.

At S230, information about a business as usual transaction associated with the generic primary account number may be received from an acquirer bank. At S240, a multi-currency transaction routing platform may automatically route data about the transaction to one of the first and second funding bank accounts. For example, if a cardholder had previously indicated that the next transaction conducted with the generic primary account number should be processed using his or her euro funding bank account, the routing platform might route the data for that transaction to the appropriate funding account (i.e., the account associated with euros). According to some embodiments, the routing is based on at least one currency exchange rate value (e.g., a cardholder might indicate that he or she prefers a particular currency when an exchange rate is above or below a predetermined threshold value).

According to some embodiments, the routing is based on payment card network business rules or logic stored in a cloud environment. For example, the routing might be based on information received via an application executing on a smartphone associated with a cardholder (and the received information may be stored in a cloud environment). According to some embodiments, the smartphone application further verifies that a current geolocation associated with the transaction corresponds to the business as usual transaction. Similarly, the smartphone application might collect biometric information from the cardholder to validate the transaction. According to some embodiments, the smartphone application displays at least one currency exchange rate value to the cardholder and may include a transaction calculator to estimate a total transaction cost based on at least one currency exchange rate value (e.g., to help the cardholder make an intelligent currency selection).

Figure 3:
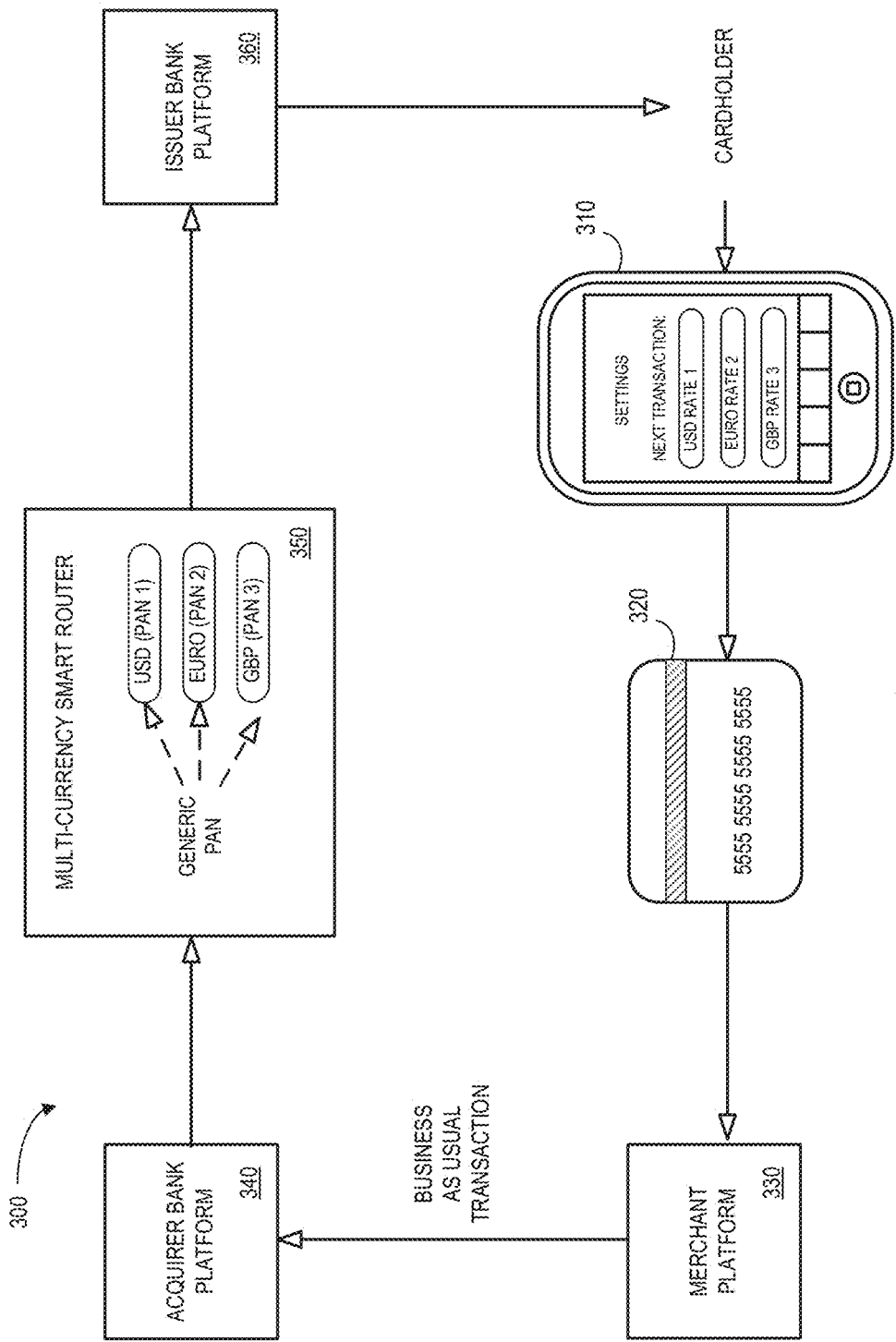
FIGS. 3 and 4 are block diagram view of systems in accordance with some embodiments.

FIG. 3 is a block diagram view of a system 300 in accordance with some embodiments. The system 300 includes a smartphone application 310 that may be utilized by a cardholder. The smartphone application 310 may, for example, be used to identify a currency/funding bank account that should be used to process the next transaction associated with a generic credit card 320 (e.g., having a generic primary account number) at a merchant platform 330, such as a merchant platform 330 associated with a Point of Sale ("PoS") transaction. The transaction will otherwise proceed to an acquirer bank platform 340 via the business as usual authorization flow. That is, the acquirer bank platform 340 may transmit information about the business as usual transaction via a credit card network. According to some embodiments described herein, a multi-currency smart router 350 will receive information from the acquirer bank platform 340, including the generic primary account number, and (based on selection previously made via the smartphone application 310) associate the transaction with the appropriate funding bank account primary account number when communicating with an appropriate issuer bank platform 360 to complete the transaction. That is, the multi-currency smart router 350 may allow one primary account number to be switched to many different funding account primary account numbers which allows for multiple currency possibilities being associated with a single card 320 via the smartphone application 310.

Figure 4:
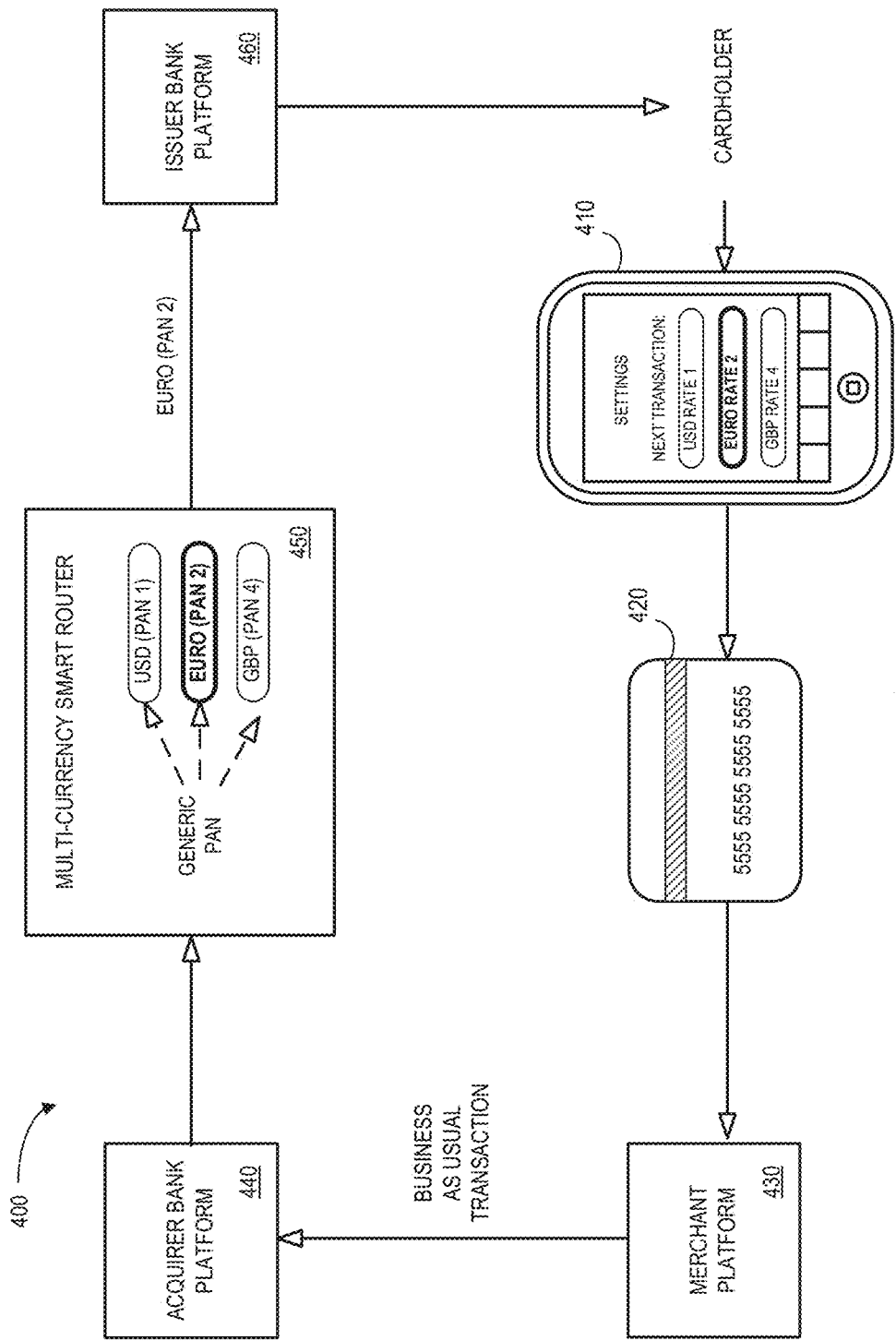

Consider, for example, FIG. 4 which is a block diagram view of a system 400 in accordance with some embodiments. In this example, a smartphone application 410 has been used by a cardholder identify "EURO" as the currency/ funding bank account that should be used to process the next transaction associated with a generic credit card 420 (e.g., a standard plastic card having a generic primary account number) at a merchant platform 430, such as a merchant platform 430 associated with a PoS transaction. This selection may be, for example, automatically transmitted to a multi-currency smart router 450. The transaction will otherwise proceed to an acquirer bank platform 440 via the business as usual authorization flow. That is, the acquirer bank platform 440 may transmit information about the business as usual transaction via a credit card network. In this example, the multi-currency smart router 450 will receive information from the acquirer bank platform 440, including the generic primary account number, and (based on selection previously made via the smartphone application 410) associate the transaction with the appropriate EURO funding bank account primary account number (PAN 2) when communicating with an appropriate issuer bank platform 460 to complete the transaction.

Figure 5:
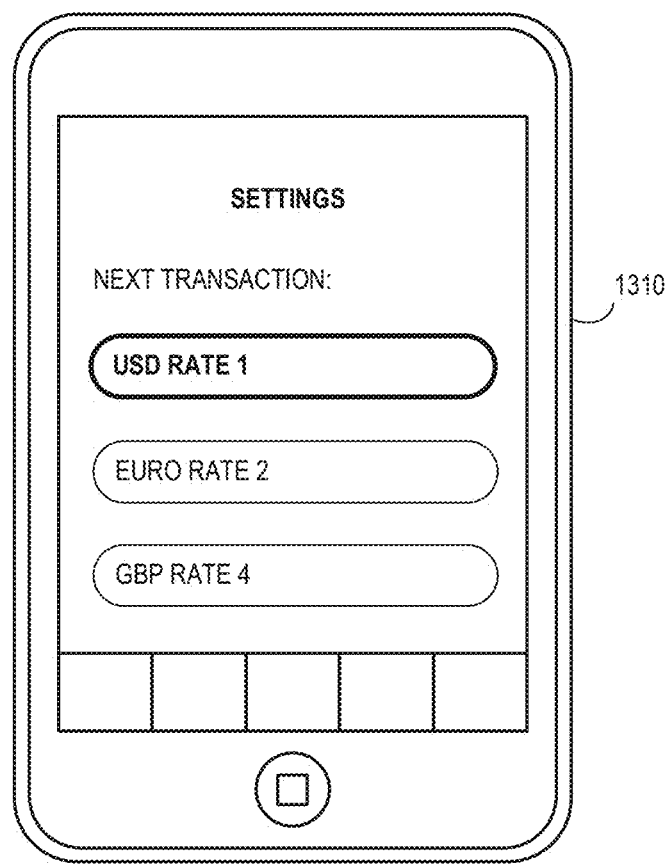
FIG. 5 is an example of a smartphone display that might be provided to a cardholder according to some embodiments.

FIG. 5 is an example of a smartphone display 500 that might be provided to a cardholder according to some embodiments. The display 500 might include, for example, user selectable indications of currencies that should be associated with the next transaction. According to some embodiments, the display may further include currency exchange rate values, exchange rate calculation options, business rules and logic options, security preferences (e.g., associated with geolocations and/or biometric information).

Figure 6:
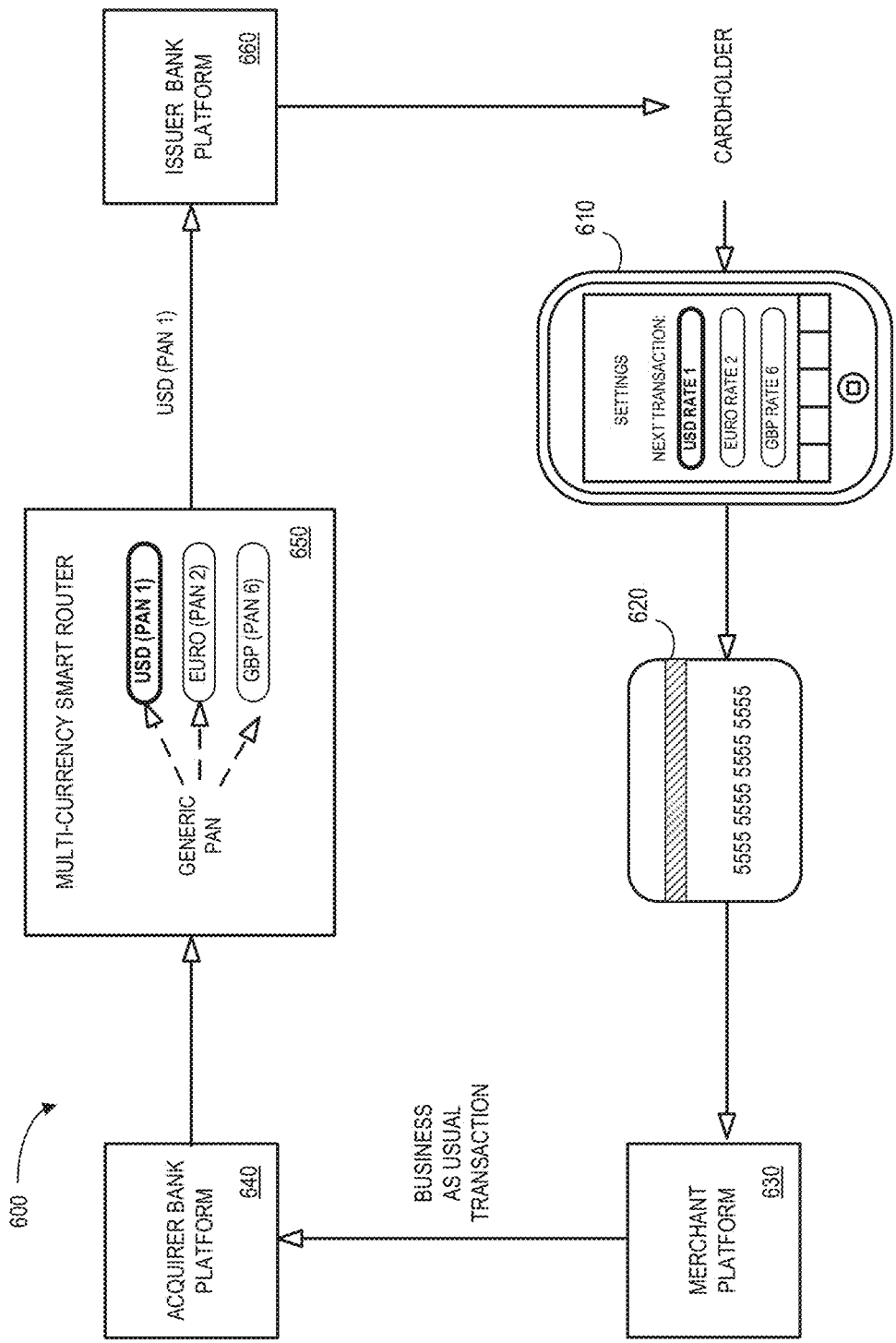
FIG. 6 is a block diagram view of a system in accordance with some embodiments.

In the example of FIG. 5, the cardholder has now selected "USD" as the currency/funding bank account that should be used to process the next transaction. FIG. 6 is a block diagram view of a system 600 in accordance with this example. That is, a smartphone application 610 has been used by a cardholder identify "USD" as the currency/funding bank account that should be used to process the next transaction associated with a generic credit card 620 (e.g., a standard plastic card having a generic primary account number) at a merchant platform 630, such as a merchant platform 630 associated with a PoS transaction. This selection may be, for example, automatically transmitted to a multi-currency smart router 650. The transaction will otherwise proceed to an acquirer bank platform 640 via the business as usual authorization flow. That is, the acquirer bank platform 640 may transmit information about the business as usual transaction via a credit card network. In this example, the multi-currency smart router 650 will receive information from the acquirer bank platform 640, including the generic primary account number, and (based on selection previously made via the smartphone application 610) associate the transaction with the appropriate USD funding bank account primary account number (PAN 1) when communicating with an appropriate issuer bank platform 660 to complete the transaction.

Thus, embodiments may help address the currency exchange rate dilemma faced by cross border travelers when making purchases in a foreign country. In particular, some embodiments described herein may allow a traveler to use a single payment card to make purchases in many different currencies using different currency funding accounts. The traveler may define what currency funding account he or she would like to use for the next transaction hailing from a single default payment card. The cardholder may define via an application on a smartphone that the next transaction from his payment card should be treated as, for example, a euro transaction. The multi-currency router may switch the transaction to a euro funding account and send it directly to issuer responsible for that account for authorization. This solution may leverage existing market infrastructure by allowing an existing standard plastic card to be the single payment instrument for several different currencies as either the user can configure what funding account to use against each of the currency exchange rates the user would like to have. According to some embodiments, the issuer may configure what funding account to use against each of the currency exchange rates the cardholder will use. The business rules associated with currency exchange rates setup in the cardholder application might not sit on the card or smartphone. The intelligence will sit on the cloud within a credit card network where the business rules associated with each currency exchange rate can be defined. The end user may be able to control at any time which currency exchange rate he or she would prefer to use for a specific transaction by the means of smartphone application (or web interface) where he or she can turn on/off the currencies of choice. In addition, the multi-currency payment solution may have an optional security mechanism where the application can identify the geolocation from the cardholder's phone location and determine if it matches with the location where the plastic card is located when it is swiped at a PoS terminal. The transaction may only be routed to the issuer bank, for example, if both locations match so that it confirms that the cardholder card is at the same place as the cardholder smartphone application. In addition, the application might collect biometric information and sends it to the multi-currency smart router for validation to ensure the cardholder is identified at the time of the purchase.

One benefit of some embodiments described herein may be that the cardholder can now have one single default payment card for all his or currency exchange rate transactions. It may represent a universal multi-currency solution to all of his or her foreign travel needs. Given that the logic does not sit at the card, the cardholder can apply/modify currency exchange rate business rules for each of the currency exchange rate funding accounts remotely by configuring his or multi-currency application as needed. The multi-currency application may, according to some embodiments, assist the cardholder in making the best currency exchange rate decision by displaying the currency exchange rates for each transaction as compared to a default currency defined by the cardholder. The cardholder would therefore have the benefit of knowing exactly what currency exchange rate will apply to each of his or her transactions. The application may also provide the cardholder with a currency exchange rate calculator to help the cardholder input the purchase amount for his/her item. In this way, the application may apply the appropriate currency exchange rate and estimate the total cost for each currency exchange rate chosen by the cardholder.

According to some embodiments, the acquirer bank may not need to do any development because the process will be treated as a business as usual purchase transaction. From the issuer bank point of view, there may be no need to issue/re-issue new plastic cards as new currencies becomes available. The issuer can basically provide a Virtual Card Number ("VCN") number for the specific currency exchange rates account to the cardholder. The cardholder can configure his or her application to associate the specific currency exchange rate VCN currency account with the currency exchange rates of choice (e.g., in connection with an online or ecommerce transaction). The cardholder can use his or her standard payment card to initiate the transaction at point of sales and select the specific currency exchange rate of choice. The multi-currency payment solution may sit within a credit card network and take care of the rest by switching the generic primary account number transaction to the appropriate currency exchange rate funding account defined by the cardholder via the smartphone prior to his or transaction.

Figure 7:
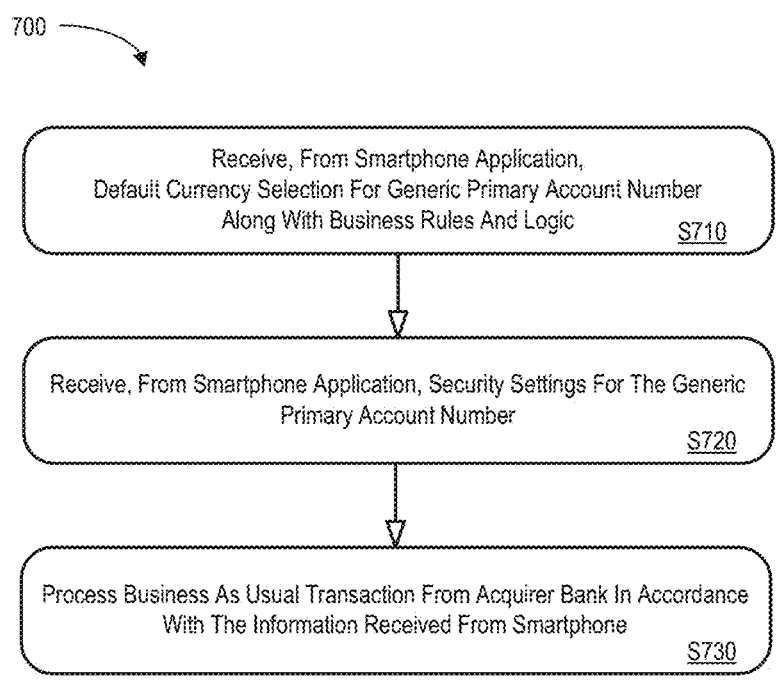
FIG. 7 is a multi-currency transaction routing platform configuration method that may be performed according to some embodiments.

FIG. 7 is a multi-currency transaction routing platform configuration method 700 that may be performed according to some embodiments. At S710, a multi-currency router may receive, from a cardholder's smartphone application, a default currency selection for a generic primary account along with business rules and logic. The cardholder might indicate, for example, the all transaction should be done using Great Britain pounds unless an exchange rate between pounds and the European euro falls below a pre-determined threshold (in which case, U.S. dollars should be used). At S720, security settings for the generic primary account number may be received from the Smartphone application (e.g., indicating that geolocations verification should active and biometric verification should be inactive). At S730, the multi-currency router may process a business as usual transaction from an acquirer bank in accordance with the information received from Smartphone (e.g., by performing verifications and/or replacing the generic primary account number as appropriate in view of the business rules and logic defined by the cardholder).

Figure 8:
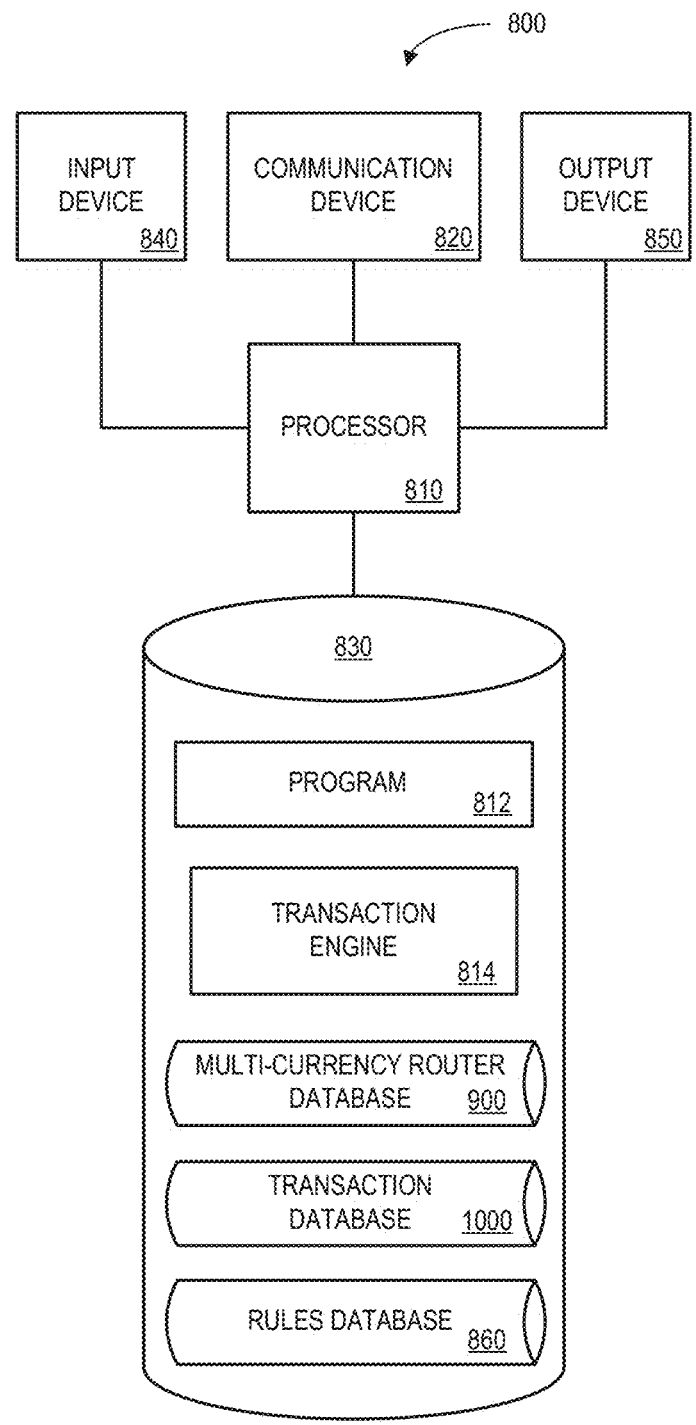
FIG. 8 is a multi-currency transaction routing platform that may be provided in accordance with some embodiments.

The embodiments described herein may be implemented using any number of different hardware configurations. For example, FIG. 8 illustrates a multi-currency routing platform 800 that may be, for example, associated with the system 200 of FIG. 2. The multi-currency routing platform 800 comprises a processor 810, such as one or more commercially available Central Processing Units (CPUs) in the form of one-chip microprocessors, coupled to a communication device 820 configured to communicate via a communication network (not shown in FIG. 8). The multi-currency routing platform 800 further includes an input device 840 (e.g., a mouse and/or keyboard to enter system configurations) and an output device 850 (e.g., a computer monitor and/or printer to generate reports).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or a transaction engine 814 (e.g., associated with a multi-currency transaction) for controlling the processor 810. The processor 810 performs instructions of the programs 812, 814, and thereby operates in accordance with any of the embodiments described herein. For example, the processor 810 may associate a generic primary account number with a first primary account number of a first funding bank account in a first currency. The processor 810 may also associate the generic primary account number with a second primary account number of a second funding bank account in a second currency. Information about a business as usual transaction, associated with the generic primary account number, may be received by the processor 810 from an acquirer bank. The processor 810 may then automatically route data about the transaction to one of the first and second funding bank accounts.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the multi-currency routing platform 800 from another device; or (ii) a software application or module within the multi-currency routing platform 800 from another software application, module, or any other source.

In some embodiments (such as shown in FIG. 8), the storage device 830 further stores a multi-currency router database 900, a transaction database 1000, and a rules database 860. Examples of databases that may be used in connection with the multi-currency routing platform 800 will now be described in detail with respect to FIGS. 9 and 10. Note that the databases described herein are only examples, and additional and/or different information may be stored therein. Moreover, various databases might be split or combined in accordance with any of the embodiments described herein.

Referring to FIG. 9, a table is shown that represents the multi-currency router database 900 that may be stored at the multi-currency routing platform 800 according to some embodiments. The table may include, for example, entries identifying currency options that are available to various cardholders. The table may also define fields 902, 904, 906 for each of the entries. The fields 902, 904, 906, may, according to some embodiments, specify: a generic primary account number 902, currencies 904, and a next transaction selection 906. The transaction database 900 may be created and updated, for example, based on information received from cardholder smartphone applications.

The generic primary account number 902 may be, for example, a unique alpha-numeric identifier associated with a multi-currency payment account. The currencies 904 may define a set of potential currencies and associated funding bank accounts that may be used in connection with the multi-currency payment account. The next transaction selection 906 may be defined by a cardholder using his or her smartphone application.

Referring to FIG. 10, a table is shown that represents the transaction database 1000 that may be stored at the multi-currency routing platform 800 according to some embodiments. The table may include, for example, entries identifying transactions that are processed via a credit card network. The table may also define fields 1002, 1004, 1006 for each of the entries. The fields 1002, 1004, 1006, may, according to some embodiments, specify: a business as usual transaction identifier 1002, a generic primary account number 1004, and a selected funding bank account 1006. The transaction database 1000 may be created and updated, for example, as transactions are executed within a credit card network.

The business as usual transaction identifier 1002 may be, for example, a unique alpha-numeric identifier associated with a credit card transaction that has been processed. The generic primary account number 1004 may be, for example, a unique alpha-numeric identifier identifying the card being used in the business as usual transaction may, according to some embodiments, be based on or otherwise associated with the generic primary account number 902 in the multi-currency router database 900. The selected funding bank account 1006 may indicate a currency and primary account number that was used to process the business as usual transaction. For example, as illustrated by the second entry in the transaction database 1000, "USD (PAN Z)" was used to process the transaction (because that had been previously selected by the cardholder as indicated by the next transaction selection 906 of the third entry in the multi-currency router database 900).

Thus, embodiments may provide a real-time information multi-currency smartphone application and routing platform that may enable a card provider to efficiently and intelligently use multi-currencies to fund his or her card purchase transactions. Embodiments described herein may be suitable for any issuer looking to deliver benefits to international traveler cardholders. The cardholder may use a single purchase card to make payments in many different currencies. The business logic may sit within the credit card network without any impact to the infrastructure of the acquirer or the issuer. A point of sale swipe may be treated as a business-as-usual purchase transaction and the multi-currency router of the credit card network may push the appropriate currency exchange rate funding account (as defined by the cardholder on his or her multi-currency smartphone application).

Figure 11:
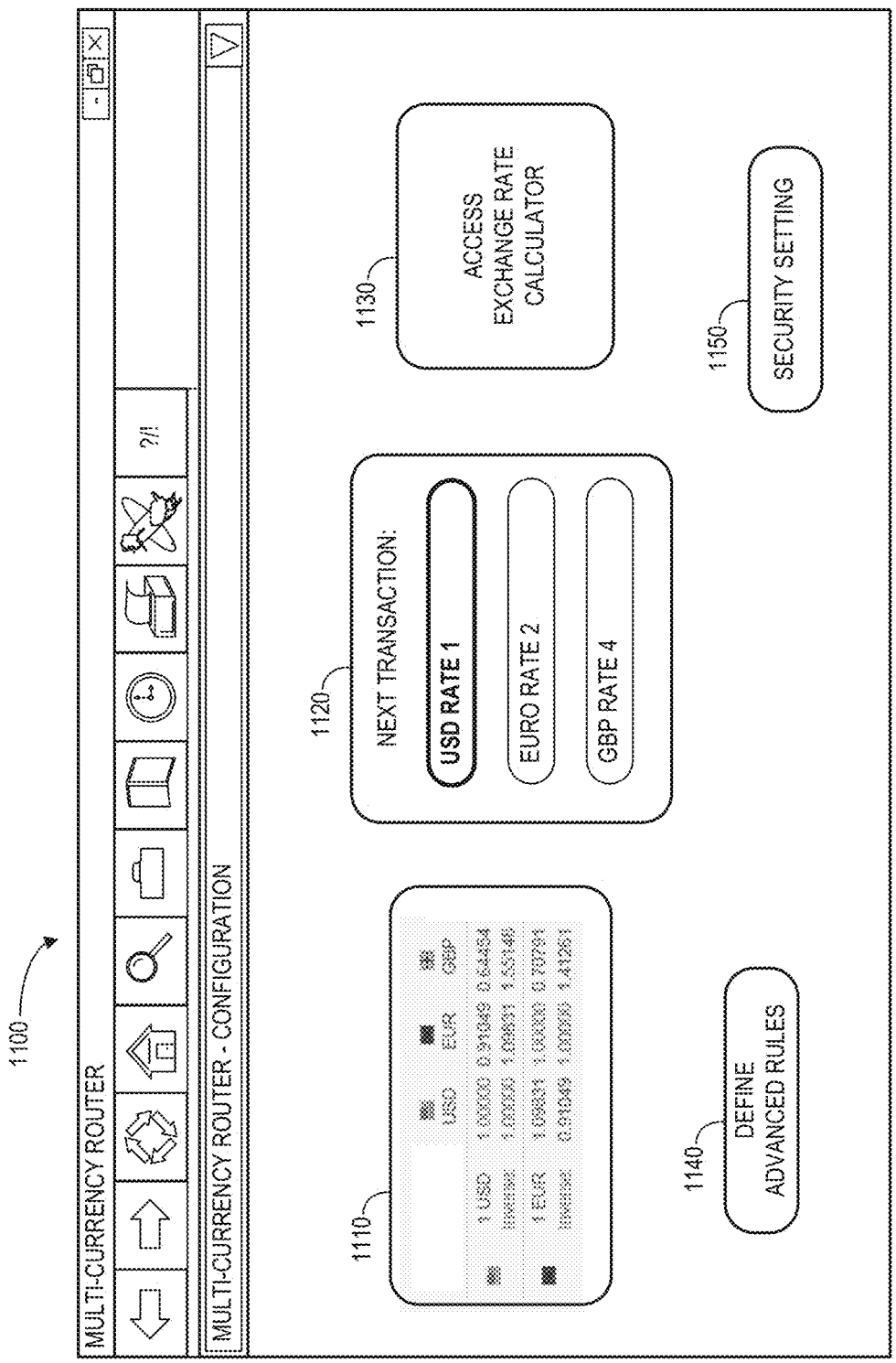
FIG. 11 is an example of a web based display that might be provided to a cardholder according to some embodiments.

Although some embodiments have been described in connection with a smartphone application cardholder interface, embodiments may be associated with other types of cardholder interfaces. For example, FIG. 11 is an example of a web based display 1100 that might be provided to a cardholder according to some embodiments. The display 1100 might include, for example, current foreign exchange rate information 1110 and a cardholder selection area 1120 that may be used to define a currency for the next transaction. The display 1100 might further provide access to an exchange rate calculator 1130, allow for advanced business rules and logic definition 1140, and/or provide for security customizations 1150.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A multi-currency transaction routing apparatus, comprising:
   a first input to receive, from an acquirer bank, an electronic message containing information about a business as usual transaction including a generic primary account number of a single payment instrument;
   a storage device storing: (i) an association between the generic primary account number of the single payment instrument and a first primary account number of a first funding bank account in a first currency, and (ii) an association between the generic primary account number of the single payment instrument and a second primary account number of a second funding bank account in a second currency wherein the first primary account number of the first funding bank account is different than the second primary account number of the second funding bank account;
   a routing module computer to detect the generic primary account number within the electronic message and to automatically transmit data about the transaction to a remote device associated with one of the first and second funding bank accounts in accordance with the associations stored in the storage device.

2. The apparatus of claim 1, wherein said routing is based on at least one currency exchange rate value.

3. The apparatus of claim 1, wherein said routing is based on payment card network business rules or logic stored in a cloud environment.

4. The apparatus of claim 1, wherein the generic primary account number is associated with a cardholder, and said routing is based on information received via an application executing on a smartphone associated with the cardholder.

5. The apparatus of claim 4, wherein the smartphone application further verifies at least one of: (i) that a current geolocation associated with the transaction corresponds to the business as usual transaction, and (ii) that biometric information received from the cardholder validates the transaction.

6. The apparatus of claim 4, wherein the smartphone application displays at least one currency exchange rate value to the cardholder and includes a transaction calculator to estimate a total transaction cost based on at least one currency exchange rate value.

7. The apparatus of claim 1, wherein the first funding bank account and the second funding bank account are associated with a single issuer bank.

8. The apparatus of claim 1, wherein the first funding bank account and the second funding bank account are associated with different issuer banks.

9. The apparatus of claim 1, wherein at least one of the first and second funding bank accounts are associated with at least one of: (i) a credit card account, (ii) a debit card account, (iii) a pre-paid account, and (iv) an electronic transaction account.

10. A method, comprising:
    associating a generic primary account number of a single payment instrument with a first primary account number of a first funding bank account in a first currency;
    associating the generic primary account number of the single payment instrument with a second primary account number of a second funding bank account in a second currency wherein the first primary account number of the first funding bank account is different than the second primary account number of the second funding bank account;
    receiving from an acquirer bank information about a business as usual transaction associated with the generic primary account number of the single payment instrument; and
    automatically routing, by a multi-currency transaction routing platform, data about the transaction to one of the first and second funding bank accounts.

11. The method of claim 10, wherein said routing is based on at least one currency exchange rate value.

12. The method of claim 10, wherein said routing is based on payment card network business rules or logic stored in a cloud environment.

13. The method of claim 10, wherein the generic primary account number is associated with a cardholder, and said routing is based on information received via an application executing on a smartphone associated with the cardholder.

14. The method of claim 13, wherein the smartphone application further verifies that a current geolocation associated with the transaction corresponds to the business as usual transaction.

15. The method of claim 13, wherein the smartphone application further collects biometric information from the cardholder to validate the transaction.

16. The method of claim 13, wherein the smartphone application displays at least one currency exchange rate value to the cardholder.

17. The method of claim 13, wherein the smartphone application includes a transaction calculator to estimate a total transaction cost based on at least one currency exchange rate value.

18. The method of claim 10, wherein the first funding bank account and the second funding bank account are associated with a single issuer bank.

19. The method of claim 10, wherein the first funding bank account and the second funding bank account are associated with different issuer banks.

20. The method of claim 10, wherein at least one of the first and second funding bank accounts is associated with at least one of: (i) a credit card account, (ii) a debit card account, (iii) a pre-paid account, and (iv) an electronic transaction account.

21. A non-transitory, computer readable medium having stored therein instructions that, upon execution, cause a computer to perform a method, the method comprising:
    associating a generic primary account number of a single payment instrument with a first primary account number of a first funding bank account in a first currency;
    associating the generic primary account number of the single payment instrument with a second primary account number of a second funding bank account in a second currency wherein the first primary account number of the first funding bank account is different than the second primary account number of the second funding bank account;

receiving from an acquirer bank information about a business as usual transaction associated with the generic primary account number of the single payment instrument; and automatically routing, by a multi-currency transaction routing platform, data about the transaction to one of the first and second funding bank accounts.

22. The medium of claim 21, wherein the generic primary account number is associated with a cardholder, and said routing is based on information received via an application executing on a smartphone associated with the cardholder.

23. The medium of claim 22, wherein the first funding bank account and the second funding bank account are associated with a single issuer bank.

24. The medium of claim 22, wherein the first funding bank account and the second funding bank account are associated with different issuer banks.

25. The medium of claim 22, wherein at least one of the first and second funding bank accounts are associated with at least one of: (i) a credit card account, (ii) a debit card account, (iii) a pre-paid account, and (iv) an electronic transaction account.

* * * * *